US012607556B2

(12) United States Patent
Fabas et al.

(10) Patent No.: US 12,607,556 B2
(45) Date of Patent: Apr. 21, 2026

(54) MOLECULAR DETECTOR FOR SURFACE-ENHANCED INFRARED ABSORPTION SPECTROSCOPY

(71) Applicant: OFFICE NATIONAL D'ETUDES ET DE RECHERCHES AÉROSPATIALES, Palaiseau (FR)

(72) Inventors: Alice Fabas, Palaiseau (FR); Patrick Bouchon, Verrieres le Buisson (FR); Hasnaa El Ouazzani, Palaiseau (FR); Riad Haïdar, Paris (FR); Jean-Paul Hugonin, Orsay (FR); Jean-Jacques Greffet, Verriere le Buisson (FR)

(73) Assignee: OFFICE NATIONAL D'ETUDES ET DE RECHERCHES AÉROSPATIALES, Palaiseau (FR)

( * ) Notice: Subject to any disclaimer, the term of this patent is extended or adjusted under 35 U.S.C. 154(b) by 247 days.

(21) Appl. No.: 18/258,182

(22) PCT Filed: Dec. 9, 2021

(86) PCT No.: PCT/FR2021/052269
§ 371 (c)(1),
(2) Date: Jun. 16, 2023

(87) PCT Pub. No.: WO2022/129744
PCT Pub. Date: Jun. 23, 2022

(65) Prior Publication Data
US 2024/0068937 A1      Feb. 29, 2024

(30) Foreign Application Priority Data
Dec. 18, 2020    (FR) ..................................... 2013597

(51) Int. Cl.
| | |
|---|---|
| *G01N 21/552* | (2014.01) |
| *G01N 21/03* | (2006.01) |

(Continued)

(52) U.S. Cl.
CPC ....... *G01N 21/3577* (2013.01); *G01N 21/554* (2013.01); *G01N 2021/035* (2013.01); *G01N 2021/7789* (2013.01)

(58) Field of Classification Search
CPC ............. G01N 21/3577; G01N 21/554; G01N 2021/035; G01N 2021/7789; G01N 21/35; G01N 2021/0346
See application file for complete search history.

(56) References Cited

U.S. PATENT DOCUMENTS 11,187,652 B2 *  11/2021  Altug Yanik ......... G01J 3/2803
12,292,380 B2 *  5/2025   Shvets ................... G02B 5/008

OTHER PUBLICATIONS

Lalanne, Philippe, et al. "Light interaction with photonic and plasmonic resonances." Laser & Photonics Reviews 12.5 (2018): 1700113.*

(Continued)

*Primary Examiner* — Rebecca C Bryant
(74) *Attorney, Agent, or Firm* — Maier & Maier, PLLC

(57) ABSTRACT
A detector (100) for surface-enhanced infrared absorption spectroscopy comprises resonators which are distributed over a surface (S) of a support (1), said surface being intended to receive a sample (101) to be tested. The resonators are able to provoke a spectral reflectance of at least 40% for electromagnetic radiation that is incident on the surface of the support, in the absence of a sample, and when the radiation is at the resonance wavelength value of the resonators. The detector has high sensitivity to small amounts of a target molecule.

16 Claims, 3 Drawing Sheets

(51) Int. Cl.
G01N 21/3577 (2014.01)
G01N 21/77 (2006.01)

(56) References Cited

OTHER PUBLICATIONS

Paul Chevalier, Patrick Bouchon, Riad Haïidar, Fabrice Pardo; Optical Helmholtz resonators. Appl. Phys. Lett. Aug. 18, 2014; 105 (7): 071110. https://doi.org/10.1063/1.4893786 (Year: 2014).*

Franziska B. Barho, et al., "Highly doped semiconductor plasmonic nanoantenna arrays for polarization selective broadband surface-enhanced infrared absorption spectroscopy of vanillin", Nanophotonics, vol. 7, No. 2, 2018, pp. 507-516 (10 pages), https://www.degruyter.com/document/doi/10.1515/nanoph-2017-0052/html.

Lisa V. Brown, et al., "Fan-Shaped Gold Nanoantennas above Reflective Substrates for Surface-Enhanced Infrared Absorption (SEIRA)", Nano Letters, ACS Publications, vol. 15, published Jan. 7, 2015, pp. 1272-1280 (9 pages), https://pubs.acs.org/doi/10.1021/nl504455s.

Paul Chevalier, et al., "Extraordinary transmission in optical Helmholtz resonators", Optics Letters, vol. 40, No. 12, published Jun. 5, 2015, pp. 2735-2738 (4 pages).

Paul Chevalier, et al., "Giant field enhancement in electromagnetic Helmholtz nanoantenna", American Physical Society, Physical Review B, vol. 90, published Nov. 10, 2014, 6 pages, https://journals.aps.org/prb/abstract/10.1103/PhysRevB.90.195412.

Paul Chevalier, et al., "Optical Helmholtz resonators", Applied Physics Letters, vol. 105, published Aug. 21, 2014, pp. 071110-1-071110-4 (5 pages), http://dx.doi.org/10.1063/1.4893786.

Paul Chevalier, et al., "Experimental demonstration of the optical Helmholtz resonance", Applied Physics Letters, vol. 112, published Apr. 26, 2018, 4 pages.

Christian Huck, et al., "Chemical Identification of Single Ultrafine Particles Using Surface-Enhanced Infrared Absorption", American Physical Society, Physical Review Applied, vol. 11, published Jan. 18, 2019, 11 pages, https://journals.aps.org/prapplied/abstract/10.1103/PhysRevApplied.11.014036.

Frank Neubrech, et al., "Surface-Enhanced Infrared Spectroscopy Using Resonant Nanoantennas", Chemical Reviews, ACS Publications, Published Mar. 30, 2017, 36 pages, https://pubs.acs.org/doi/10.1021/acs.chemrev.6b00743.

Onera, "Resonateurs de Helmholtz optiques: Alice Fabas vous presente sa these", Sep. 22, 2021, 2 pages, https://www.youtube.com/watch?v=RQgqVYy5UZk.

Yinong Xie, et al., "Ultra-wideband enhancement on mid-infrared fingerprint sensing for 2D materials and analytes of monolayers by a metagrating", Nanophotonics, vol. 9, No. 9, Jun. 18, 2020, pp. 2927-2935 (9 pages).

Weisheng Yue, et al., "Multiple-resonant pad-rod nanoantennas for surface-enhanced infrared absorption spectroscopy", Nanotechnology, vol. 30, Sep. 4, 2019, 12 pages.

International Search Report and Written Opinion of the ISA for PCT/FR2021/052269 dated Jun. 2, 2022, 12 pages.

Tittl et al., "Imaging-Based Molecular Barcoding with Pixelated Dielectric Metasurfaces", Science, Jun. 8, 2018, vol. 360, No. 6393, with supplementary materials, 28 pages.

* cited by examiner

MOLECULAR DETECTOR FOR SURFACE-ENHANCED INFRARED ABSORPTION SPECTROSCOPY

CROSS-REFERENCE TO RELATED APPLICATIONS

This application is the U.S. national phase of International Application No. PCT/FR2021/052269 filed Dec. 9, 2021 which designated the U.S. and claims priority to FR Patent Application No. 2013597 filed Dec. 18, 2020, the entire contents of each of which are hereby incorporated by reference.

TECHNICAL FIELD

This description relates to a detector for surface-enhanced infrared absorption, or SEIRA, spectroscopy.

PRIOR ART

SEIRA detectors combine several advantages over other infrared spectroscopy techniques, for revealing molecules that are identified through their ability to absorb electromagnetic radiation. Among the advantages of SEIRA detectors are their low cost, their compactness, their ease of use, the speedy analysis, and their sensitivity to small quantities of molecules to be detected. Their applications are numerous, including the detection of proteins for medical diagnosis, the monitoring of certain levels of molecules, environmental protection control, home security, the detection of hazardous molecules for safety applications, etc.

Known SEIRA detectors consist of gold nanoantennas which are placed above a reflective substrate. The surface structure which is thus formed has a resonance that is a function of a wavelength of an electromagnetic radiation which is sent to this structure. Apart from this resonance, the spectral reflectance factor of the structure is close to 100%, and it is zero for the resonance value of the radiation wavelength. This zero-reflectance behavior at resonance is referred to as critical coupling in the terminology of those skilled in the art, to mean that all incident radiative energy is absorbed at resonance. When molecules which are absorbent at the resonance wavelength of the surface structure are deposited thereon, they alter the coupling of the surface structure to the external propagation medium of the radiation, so that the critical coupling conditions are no longer satisfied. A non-zero level of spectral reflectance thus reappears in the presence of such molecules, enabling their detection with good sensitivity. This sensitivity to small quantities of the molecules to be tested for in a sample results from an enhancement of the electric field produced by the nanoantennas.

However, for such SEIRA detectors which are based on resonators under critical coupling conditions, it is necessary that an absorption line of the molecule to be detected be superimposed on the resonance wavelength of the resonators, and that the detection of the reflected radiation be carried out for this resonance wavelength, in order to have a high sensitivity. But when this double spectral coincidence is not achieved, the sensitivity of the SEIRA detector for a small quantity of molecules potentially present in the tested sample is not as good.

The article by Yue Weisheng et al. which is entitled "Multiple-resonant pad-rod nanoantennas for surface-enhanced absorption spectroscopy", Nanotechnology, vol. 30, Sep. 4, 2019, p. 465206, discloses a SEIRA detector in which the energy of the radiation can be coupled to MIM (metal-insulator-metal) systems, by resonance effect, which produces an almost total absorption of the radiation at certain frequencies.

Technical Problem

On the basis of this situation, one object of the present invention is to propose new SEIRA detectors which do not have the disadvantage which has just been mentioned. In particular, one object of the invention is to provide SEIRA detectors which do not require that the absorption line of the molecules to be detected be superimposed exactly on the resonance wavelength value, while retaining a sensitivity similar to those of existing SEIRA detectors or providing superior sensitivity.

Finally, an additional object of the invention is to provide SEIRA detectors that can be manufactured simply, with a high level of reproducibility and at low cost.

SUMMARY OF THE INVENTION

To achieve at least one of these or another object, a first aspect of the invention proposes a new detector for surface-enhanced infrared absorption spectroscopy, which is suitable for revealing the presence of molecules, referred to as target molecules, when at least one absorption wavelength of these target molecules is comprised between 2 µm (micrometers) and 10 µm, and is also comprised within an effective spectral range of the detector. This detector comprises:

an opaque support, having a surface which comprises a plurality of electromagnetic resonators, the support being intended to receive, on or in its surface, a sample to be tested and capable of containing the target molecules, the resonators having a resonance wavelength $\lambda_r$ and a quality factor Q, and the effective spectral range of the detector being between $\lambda_r \cdot (1-1/Q)$ and $\lambda_r \cdot (1+1/Q)$;

stimulation means, which are suitable for sending infrared radiation onto the surface of the support, or to cause an emission of infrared radiation by the surface of the support, the infrared radiation having a non-zero spectral intensity at at least one instant during operation of the detector for each wavelength which is within the effective spectral range of the detector; and optical detection means, suitable for detecting an alteration in part of the infrared radiation coming from the surface of the support, this alteration being produced by the target molecules contained in the sample located on or in the surface of the support.

According to the invention, the resonators are adapted and arranged in the surface of the support so that this surface has an impedance, for an electromagnetic wave incident on the surface of the support and having the resonance wavelength $\lambda_r$ of the resonators, which is different from the impedance of a vacuum, with the difference between the impedance of the surface of the support and the impedance of the vacuum being adapted so that the minimum of the spectral reflectance factor of the surface of the support, as produced by the resonators at resonance wavelength $\lambda_r$ in the absence of target molecules, is greater than 40%, preferably greater than 60%. In other words, the resonators are not under critical coupling conditions in a SEIRA detector according to the invention, which produces the level of reflectance greater than 40%, or greater than 60%, for the support provided with resonators at their resonance wavelength $\lambda_r$.

According to the invention, this non-zero value of minimum reflectance for the resonance wavelength $\lambda_r$ of the resonators makes it possible to render highly visible the alterations in the spectrum of the radiation coming from the support, which are caused by the target molecules. In addition, it is not necessary that the absorption line of the target molecules be precisely superimposed on the resonance wavelength $\lambda_r$ of the resonators in order for the detector to have high sensitivity to small quantities of the target molecules. It is sufficient for this absorption line to be inside the spectral interval which is between $\lambda_r \cdot (1-1/Q)$ and $\lambda_r \cdot (1+1/Q)$. It is then possible that this spectral interval from $\lambda_r \cdot (1-1/Q)$ to $\lambda_r \cdot (1+1/Q)$ simultaneously contains several absorption lines which are spectrally separated. This plurality of lines then makes it possible to detect several target molecules simultaneously in a sample, and/or to discriminate between two target molecules which have absorption lines superimposed on one wavelength value but which also have other lines which are spectrally separated although still contained within the spectral interval from $\lambda_r \cdot (1-1/Q)$ to $\lambda_r \cdot (1+1/Q)$.

The spectral interval which extends from $\lambda_r \cdot (1-1/Q)$ to $\lambda_r \cdot (1+1/Q)$ is the resonance interval of the resonators. It is therefore specific to each model of detectors according to the invention. The effective spectral range of each detector is contained within this resonance interval of the resonators, or else is contained within a combination of several resonance intervals of resonators when the detector comprises several types of resonators which have different resonance intervals. The effective spectral range of the detector may be restricted concerning the resonance interval of the resonators, or where appropriate concerning the combination of these resonance intervals, for various reasons, including the type of detection means which are used, for which the sensitivity can be limited to restricted spectral windows. The resonance interval or intervals of the resonators, as well as the effective spectral range, are characteristics of the detector. At least the effective spectral range is provided with the detector, in a manual which is attached thereto or which is accessible online electronically, i.e. via the Internet, by means of a reference number for this detector.

High sensitivity can be obtained for the SEIRA detector of the invention, for low—or very low—quantities of target molecules, by choosing resonators which produce particularly considerable enhancements of the electric field. In particular, the resonators of a detector according to the invention may be selected among Fabry-Perot interferometers, plasmonic-antenna resonators, and Helmholtz electromagnetic resonators.

When the resonator is of Helmholtz-type, each resonator is composed of a portion of a dielectric material which is in between a bottom and an overcoat layer of the resonator, both of which are electrically conducting and parallel to the surface of the support. Furthermore, for each resonator the overcoat layer is divided by a slot into two overcoat portions which are electrically insulated from one another. The zone of enhancement of the electric field is then located in and close to the slot.

In one particularly advantageous model of Helmholtz-type resonators, insulating volumes which respectively relate to neighboring resonators are not separated, so that the structure of the set of resonators does not include intermediate conducting walls between the resonators, which are oriented perpendicularly to the surface of the support. In other words, the bottoms and the portions of the dielectric material extend continuously between two adjacent resonators in the surface of the support, as well as the contiguous portions of the overcoat layer of these adjacent resonators. For this reason, the structure of the SEIRA detector is simplified, and consequently its manufacture as well. This results in a high level of reproducibility in manufacturing, and a cost price which is low. This type of resonator with an insulating volume which extends continuously between adjacent resonators is sometimes called a simplified Helmholtz resonator or a Helmholtz-like resonator.

In preferred embodiments of the invention, at least one of the following additional features may optionally be reproduced, alone or several of them combined:

the detector may further comprise a plate which is semi-transparent to an electromagnetic wave that is incident on the surface of the support and has any wavelength value within the effective spectral range of the detector. This plate is arranged above the surface of the support and parallel to it so that the sample to be tested is located between the surface of the support and the plate. The result is a reinforced confinement of the radiation above the support, which further increases the sensitivity of the SEIRA detector;

an electrically conducting material of some parts of each resonator may be based on a metal, in particular selected among gold (Au), silver (Ag), nickel (Ni), titanium (Ti), chromium (Cr), and aluminum (Al), or based on graphene or titanium nitride (TiN), or based on a doped semiconductor material, in particular selected among tin-doped indium oxide (ITO), zinc oxide (ZnO), and fluorine-doped tin oxide ($SnO_2$:F);

an electrically insulating material of other parts of each resonator may be based on silica ($SiO_2$), alumina ($Al_2O_3$), titanium oxide ($TiO_2$), silicon nitride ($Si_3N_4$), hafnium oxide ($HfO_2$), zinc sulfide (ZnS), zinc selenide (ZnSe), or based on an undoped semiconductor, or based on a polymer, in particular selected among polymethyl methacrylate (PMMA), polyethylene (PET), and a polyimide;

when the detector is intended to reveal the presence of molecules which are specified for this detector, for example by being specified in its manual, and which act as target molecules during the use of the detector, the resonators may be adapted to exhibit values for the resonance wavelength $\lambda_r$ which vary between several of the resonators, the interval from $\lambda_r \cdot (1-1/Q)$ to $\lambda_r \cdot (1+1/Q)$ for one of these resonance wavelength values containing at least one absorption wavelength value of the specified molecules, and the interval from $\lambda_r \cdot (1-1/Q)$ to $\lambda_r \cdot (1+1/Q)$ for at least one other of the resonance wavelength values containing at least one other absorption wavelength value which differentiates the specified molecules from other molecules also likely to be contained in the sample to be tested; and at least some of the resonators may be tunable, so that a value of the resonance wavelength of these tunable resonators varies as a function of a control parameter applied to each tunable resonator.

In general for the invention, the support may be suitable for receiving the sample to be tested inside a fluidic circuit which is located in or on the surface of the support, in addition to the plurality of resonators. Alternatively, it may be adapted to receive the sample to be tested on the surface of the support, by deposition, adsorption, or fixation. For the latter case, the detector may further comprise at least one chemical functionalization compound which is grafted onto the surface of the support, this chemical functionalization compound being selected so as to selectively bind the specified molecules.

Still in general for the invention, the stimulation means may comprise a source of infrared radiation which is external to the support, and which is arranged to send the infrared radiation to the surface of the support. In this first case, the optical detection means are arranged to receive part of the infrared radiation which has been produced by the source and then reflected by the surface of the support. Alternatively, the stimulation means may comprise means for heating the support. In this second case, the optical detection means are arranged to receive at least part of the infrared radiation which is thermally emitted by the surface of the support.

Also in general for the invention, the optical detection means may comprise a spectrometer or a hyperspectral sensor. However, when the detector is intended to reveal the presence of molecules specified for this detector and acting as target molecules during use of the detector, the optical detection means may comprise a spectral filter having a filtering window which contains the absorption wavelength of the specified molecules, and may also comprise a sensor arranged to receive at least part of the infrared radiation which comes from the surface of the support through the spectral filter. Alternatively, the optical detection means may comprise an array of spectral filters, of which at least one has a filter window which contains the absorption wavelength of the specified molecules, and may also comprise an image sensor arranged to capture an image of the array of spectral filters, this image being formed by the infrared radiation which comes from the surface of the support and passes through the array of spectral filters.

A second aspect of the invention proposes a method for revealing, in a sample to be tested, the presence of target molecules identified by at least one absorption wavelength of these target molecules which is between 2 μm and 10 μm. This method comprises the following steps:

/1/ providing a detector which is in accordance with the first aspect of the invention, and for which the effective spectral range contains the absorption wavelength of the target molecules;

/2/ bringing at least part of the sample onto or into the surface of the support of the detector which includes the electromagnetic resonators; and /3/ simultaneously activating the stimulation means and the optical detection means of the detector, in order to detect an alteration in part of the infrared radiation which comes from the surface of the support, this alteration being produced by the target molecules for their absorption wavelength.

The radiation alteration that is detected in step /3/ reveals the presence of the target molecules.

It is possible to provide a detector in step /1/ which is specifically dedicated to revealing the presence of certain target molecules, which are then specified for this detector. Then, the target molecules whose presence is to be revealed in the tested sample are part of the molecules specified for the detector.

BRIEF DESCRIPTION OF FIGURES

The features and advantages of the invention will become more clearly apparent in the following detailed description of some non-limiting embodiments, with reference to the appended figures, which include.

DETAILED DESCRIPTION OF THE INVENTION

For clarity, the dimensions of the elements represented in these figures correspond neither to actual dimensions nor to actual dimensional ratios. Furthermore, some of these elements are represented only symbolically, and identical references indicated in different figures designate elements which are identical or which have identical functions.

Figure 1A:
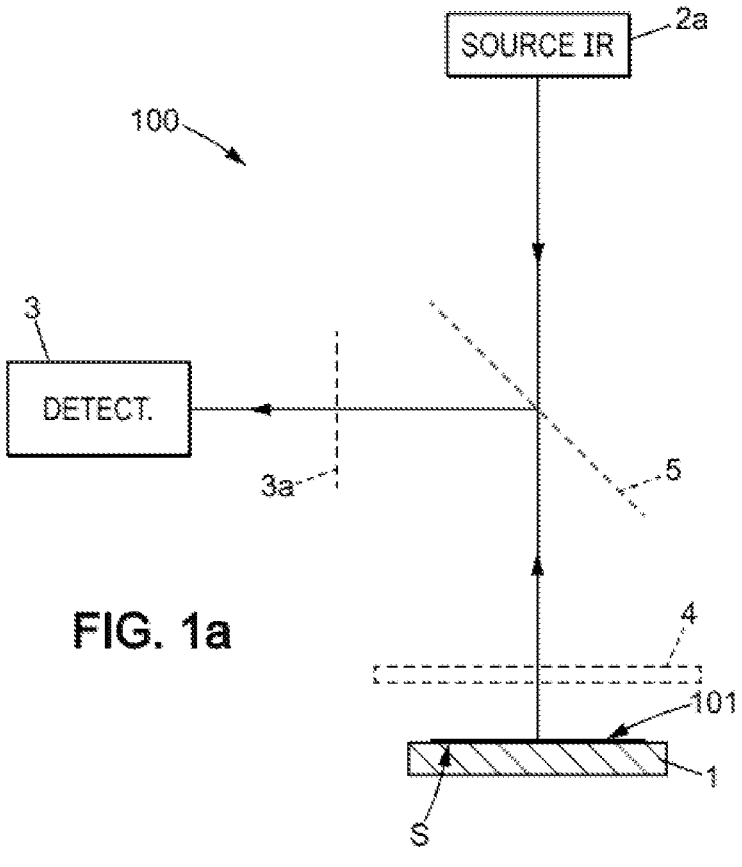
FIG. 1a is a block diagram of a SEIRA spectroscopic detector, which is in accordance with a first embodiment of the invention.

In accordance with FIG. 1a, a SEIRA spectroscopic detector which is designated overall by the reference 100 comprises a support 1, with a free surface S of this support 1 which is available to receive a sample to be tested 101, for example a sample of biological fluid. An infrared radiation source 2a, denoted SOURCE IR, is arranged to illuminate surface S of support 1 with infrared radiation at a wavelength of between 2 μm and 10 μm. For the embodiment which is illustrated by FIG. 1a, source 2a constitutes the stimulation means introduced in the general part of this description. Surface S provided with sample 101 reflects part of the radiation from source 2a, according to a spectral reflectance factor value, also called reflectivity, which on the one hand depends on the wavelength, and on the other hand depends on the possible presence of molecules identified in sample 101, called target molecules. The part of the radiation which is reflected by surface S of support 1 is directed towards optical detection means 3, denoted DETECT. A beamsplitter 5 may be used to combine a first optical lighting path which connects source 2a to surface S, with a second optical analysis path which connects this surface S to optical detection means 3. Optionally, another beamsplitter 4, which is semi-reflective for the radiation produced by source 2a, may be arranged above surface S and parallel thereto in order to increase, by the effect of multiple reflections between plate 4 and surface S, the effective intensity of the radiation from source 2a to which sample 101 is exposed. The level of spectral reflectance of surface S of support 1 which is measured by optical detection means 3 constitutes the response of detector 100. Improving this response is the object of the invention and will be described in detail below.

Several types of optical detection can alternatively be implemented within SEIRA spectroscopic detector 100. According to a first possibility, optical detection means 3 can be adapted to carry out a spectral analysis of the radiation reflected by surface S, which is continuous as a function of the wavelength. To achieve this, optical detection means 3 may be composed of a spectrometer. However, such an embodiment may be complex, expensive, and not very compatible with rapidly performing large numbers of tests. According to a second possibility, optical detection means 3 may be adapted to detect the radiation which is reflected by surface S for only a limited number of wavelength values which are of interest because they concern the target molecules. For example, optical detection means 3 may be composed of a hyperspectral sensor. Such a hyperspectral sensor can thus be adapted to provide a radiation intensity value for each of a set of wavelength values. To do so, the hyperspectral sensor incorporates appropriate filtering means. According to an alternative embodiment of a hyperspectral sensor, one which is particularly economical, optical detection means 3 may comprise an image sensor which has a wide—or very wide—spectral window of sensitivity, and which is associated with an array of spectral filters 3a, each of them narrowband. The array of filters 3a is then interposed on the optical path of analysis, for example between beamsplitter 5 and the wideband image sensor. For such an embodiment, the image sensor is further associated with imaging optics, which are designed to form an image of the array of filters 3a on the image sensor. Each analysis wavelength of the radiation reflected by surface S is then identified by a fixed location in each image captured by the sensor, determined by the structure of the array of filters 3a. Finally, a third possibility for optical detection means 3 may be limited to an analysis at a single wavelength. In this case, this single analysis wavelength corresponds to an absorption line of the target molecules. Optical detection means 3 may then comprise a sensor with a wide window of spectral sensitivity, such as a bolometer, which is placed behind a spectral filter whose transmission band corresponds to the absorption line of the target molecules. For all these embodiments of detector 100, all in accordance with FIG. 1a, the source of the infrared radiation is external to support 1.

Figure 1B:
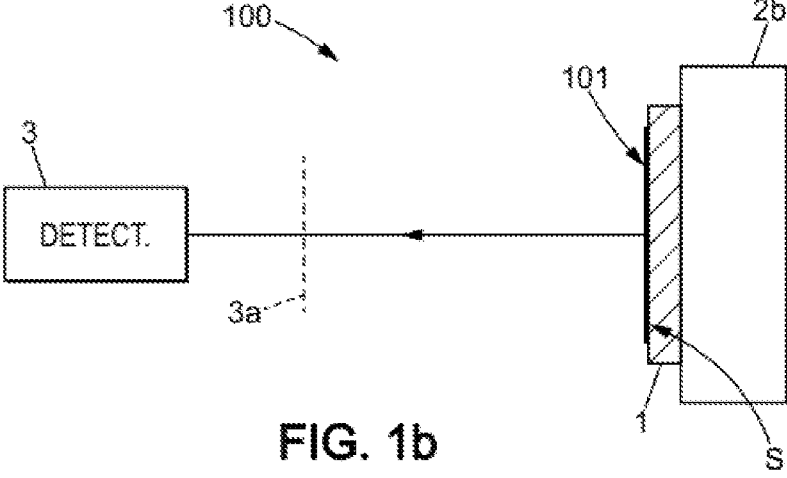
FIG. 1b corresponds to FIG. 1a for another SEIRA spectroscopic detector, which is in accordance with a second embodiment of the invention.

FIG. 1b illustrates another possible embodiment for SEIRA spectroscopic detector 100, for which the source of the infrared radiation consists of support 1. For this purpose, support 1 is arranged to be heated by suitable heating means 2b, for example an electric resistive heating plate, so that surface S of support 1 itself produces infrared radiation, by the effect of thermal emission, at a wavelength of between 2 μm and 10 μm, of which a part is altered by the presence of the target molecules in sample 101. Heating means 2b then constitute the stimulation means which are mentioned in the general part of this description. At least part of the radiation which is thus thermally emitted by surface S of support 1 is received by optical detection means 3. This other embodiment, based on the thermal emission of support 1, can be associated with each possibility listed above for optical detection means 3. But the signal which is delivered by optical detection means 3 for this other thermal emission-based embodiment of support 1 (FIG. 1b), is complementary in relation to 1.0, or to 100% depending on the scale used, with the signal delivered by these same optical detection means 3 used for the embodiment with an infrared radiation source external to support 1 (FIG. 1a).

Support 1 is opaque to radiation having a wavelength between 2 μm and 10 μm. To achieve this, it may be composed of a metal material except for a microstructure which is formed in its surface S and which will be described further below. Alternatively, a base part of support 1 may be composed of a block of any solid material, which is covered by a metal base layer, for example of gold. This metal base layer is then thick enough to be opaque, and forms surface S while being provided with the microstructure. Sample 101 may be intended to be deposited on surface S, for example in the form of a drop in the case of a liquid sample. Optionally, surface S may be designed to adsorb the target molecules potentially present in sample 101, or to fix them by means of selective binding via chemical functions which may have been grafted onto surface S. Alternatively, surface S may be provided with a microfluidic circuit into which sample 101 is injected, when it is liquid. In any case, surface S is designed so that sample 101 is located close to the microstructure while it is being tested, and this microstructure is designed to locally produce an intense electric field from the radiation generated by the stimulation means. The local electric field produced by the microstructure is composed of spectral components which each have the same frequency as one of the frequency components of the radiation generated by the stimulation means, but the components of the local electric field have much higher intensities than the components of the radiation as generated by the stimulation means. This is the electric field enhancement effect that is used in SEIRA detectors. Due to the design of support 1 and of its surface S, the sample to be tested 101 is located in or brought into the local electric field produced by the microstructure, so that detector 100 has a high sensitivity, making it possible to reveal small or very small quantities of the target molecules present in sample 101. To thus enhance the electric field, the microstructure of surface S comprises a multitude of electromagnetic resonators which are placed next to each other within this surface. In a known manner, such electromagnetic resonators produce within themselves, or within a volume contiguous to themselves, an enhancement of the electric field when a frequency of variation of this electric field corresponds to a resonance domain of each resonator. This frequency, denoted v, is directly associated with the analysis wavelength λ of optical detection means 3, by the relationship $\lambda = C/v$, where C is the speed of light. The electromagnetic resonators of surface S may be of any type known to those skilled in the art, in particular Fabry-Pérot interferometers, plasmonic-antenna resonators, and Helmholtz electromagnetic resonators.

Figure 2A:
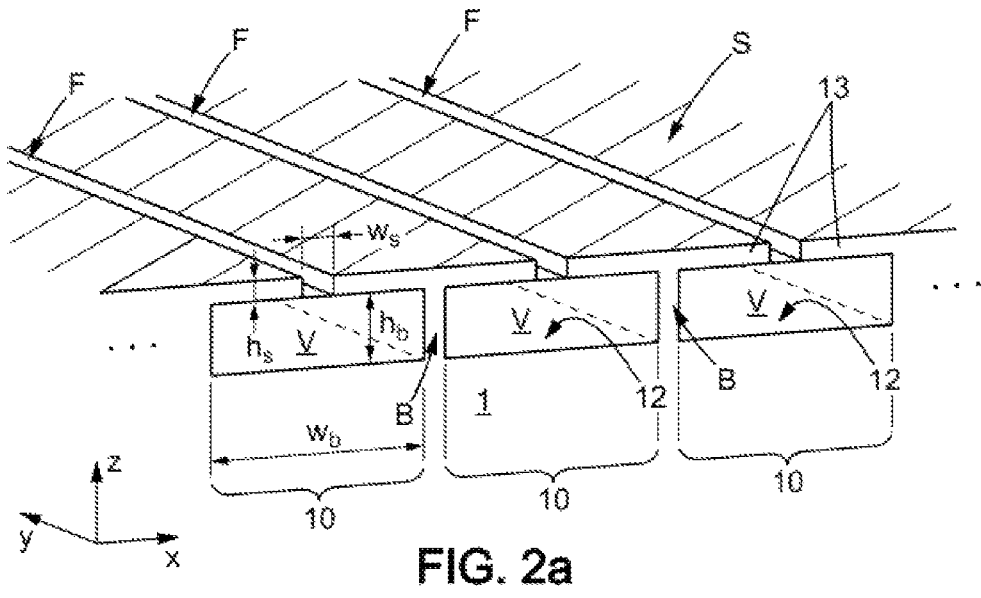
FIG. 2a is a perspective view of Helmholtz resonators which can be used in a SEIRA spectroscopic detector according to the invention.

FIG. 2a shows several electromagnetic resonators 10 which are placed next to each other within surface S of a support 1 usable for the SEIRA detectors 100 of FIG. 1a and FIG. 1b. Each resonator 10 is composed of an electrically insulating volume, denoted V, which is surrounded almost entirely by electrically conducting material. The insulating material in volume V may be silica ($SiO_2$), and the conducting material may be gold (Au), as an example. Each electromagnetic resonator 10 so constituted is located in support 1 just below surface S. A layer 13 of conducting material, which is in between volume V and surface S, comprises a slot F for each resonator 10. The interior of slot F constitutes the location for the enhancement of the electric field, as mentioned above, for this type of resonator. The model of the electromagnetic resonator represented in FIG. 2a is of the Helmholtz type, and is effective for linear polarization of electromagnetic radiation, with the electric field parallel to the x direction and the magnetic field parallel to the y direction, in accordance with the x, y, z three-dimensional reference system shown in the figure. Surface S of support 1 is parallel to the x and y directions, and each slot F extends longitudinally parallel to the y direction, x and z then respectively being the width and thickness directions of the slots F. In addition, the dimensions shown in this figure have the following meanings:

$w_b$: width of volume V, in the x direction, $h_b$: thickness of volume V, in the z direction, $w_s$: width of slot F, in the x direction, $h_s$: thickness of slot F, in the z direction, between volume V and surface S, and 12: bottom of each volume V, made of conducting material, B: side walls of each volume V, made of conducting material, separating resonators 10 which are adjacent in the x direction.

For this type of Helmholtz electromagnetic resonator, the electric field enhancement factor, defined as the quotient between the amplitude of the electric field inside slot F and that which exists at a distance above surface S, may be greater than a thousand. The infrared radiation is incident on surface S parallel to the z direction for an embodiment in accordance with FIG. 1a.

Figure 2B:
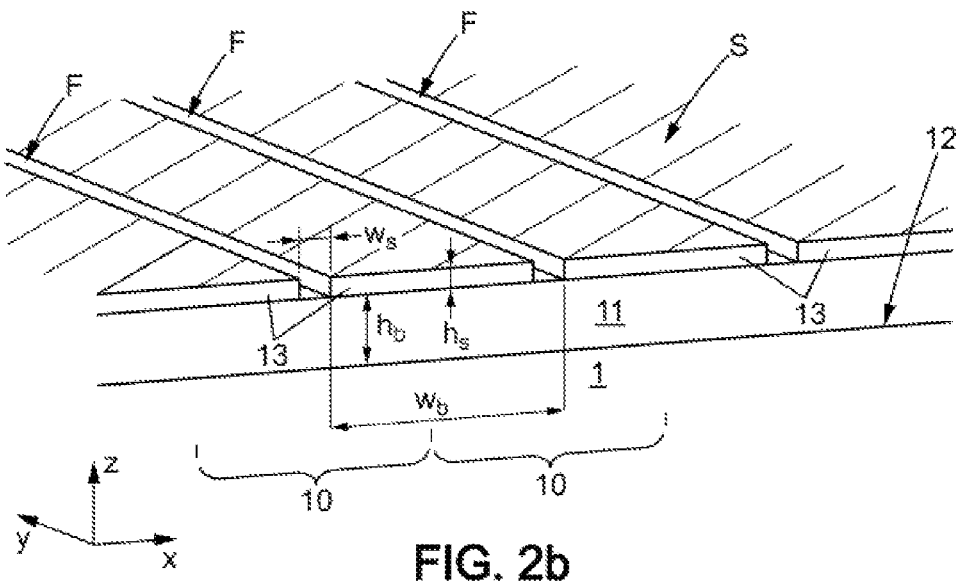
FIG. 2b corresponds to FIG. 2a for simplified Helmholtz resonators which can alternatively be used in a SEIRA spectroscopic detector according to the invention.

FIG. 2b shows a Helmholtz electromagnetic resonator model which is simplified in comparison to the one in FIG. 2a. This simplified model is obtained from a periodic repetition of a resonator 10 of FIG. 2a in the x direction, removing the barriers B which separate adjacent volumes V. Thus, all volumes V of the juxtaposed resonators 10 are united in a continuous layer of electrically insulating material, which is parallel to the x and y directions and designated by the reference 11. This layer 11 is inserted between bottom 12 which is still electrically conducting, and overcoat layer 13 which is still made of electrically conducting material and divided into parallel strips by slots F. Thus, for each resonator 10, the corresponding slot F divides overcoat layer 13 into two overcoat portions which are electrically insulated from one another within this resonator, and which connect continuously with the overcoat portions of the two neighboring resonators. Such simplified Helmholtz resonators have an operating principle which is similar to that of the separate Helmholtz resonators as shown in FIG. 2a. But they can be manufactured by steps of deposition and etching of materials in a simpler manner than the other type, since the layer of insulating material 11 remains continuous as it was deposited. Slots F can be formed using, for example, photolithography and etching methods which are known for this. Optionally, but in a manner which is not essential, slots F may be filled with an insulating material, which may or may not be identical to that of layer 11, so that the resonator microstructure then forms a surface S which is continuous and planar. $w_s$ and $h_s$ again designate the width and the thickness of slots F, $h_b$ becomes the thickness of layer 11, and $w_b$ becomes the spatial period in the arrangement of slots F in the microstructure of FIG. 2b, along the x direction.

The electromagnetic resonator microstructures of FIG. 2a and FIG. 2b exhibit resonant behaviors, according to the wavelength λ of the radiation which is received by optical detection means 3, which are similar. In particular, these behaviors have little dependency on the angle of incidence and/or the angle of emergence of the radiation relative to the z direction. For this reason, a SEIRA spectroscopic detector 100 that incorporates such resonators does not require precise alignment between its components. In addition, this low angular dependence makes it possible to use radiation which comes from surface S within a wide angular sector around the z direction, for detection by optical detection means 3. Due to this, for an embodiment of detector 100 in accordance with FIG. 1a, the radiation from source 2a may be focused on surface S using a Cassegrain lens which has a wide exit aperture angle, for example between 12° and 24°. The sensitivity of detector 100 can then be further increased, by collecting radiation which comes from surface S of support 1 within an entire angular sector which is also widened.

One way of implementing the invention is now described, by way of illustration in a case where surface S of support 1 is microstructured as illustrated by FIG. 2b, with simplified Helmholtz resonators.

In a known manner, a Helmholtz resonator has a behavior which is similar to that of an LC electric circuit, i.e. with inductor and capacitor. Its resonance wavelength value is then: $\lambda_r = 2 \cdot \pi \cdot (\varepsilon_s \cdot w_b \cdot h_b \cdot h_s / w_s)^{1/2}$, where $\varepsilon_s$ designates the relative dielectric permittivity of the medium which is present in slot F. However, the value of the product $\varepsilon_s \cdot h_s$ in this formula must be supplemented by the two terms $K_1 \cdot \varepsilon_{air} \cdot w_s$ and $K_2 \cdot \varepsilon_b \cdot w_s$ in order to take into account the spillover of the electric field which exists in each slot F, to outside beyond surface S and in layer 11. For this, $\varepsilon_{air}$ and $\varepsilon_b$ denote the respective relative dielectric permittivities of the medium external to support 1 and of the material of layer 11, and $K_1$ and $K_2$ are two geometric coefficients which quantify extensions of these spillovers. Furthermore, the relative dielectric permittivity value $\varepsilon_s$ must be replaced by $\varepsilon_s \cdot (1 + \delta_s / w_s)^{1/2}$ to account for a plasmon gap that exists in the capacitor formed by each slot F, where $\varepsilon_s$ is the depth of penetration into the electrically conducting material of overcoat layer 13. Finally, the thickness of layer 11 which is magnetically effective is $h_b + 2 \cdot \delta_s$ instead of $h_b$, to take into account the effect of the depth of penetration along the z direction which allows the magnetic field to spill over from layer 11 into bottom 12 and into overcoat layer 13. It then follows that the resonance wavelength value for simplified Helmholtz resonators is given by: $\lambda_r = 2 \cdot \pi \cdot \{[\varepsilon_s \cdot (1 + \delta_s / w_s)^{1/2} \cdot h_s + K_1 \cdot \varepsilon_{air} \cdot w_s + K_2 \cdot \varepsilon_E \cdot w_s] w_b \cdot (h_b + 2 \cdot \delta_s) / w_s\}^{1/2}$. In the presence of an electrical resistance component, which is due to the material of bottom 11 and of overcoat layer 13, the impedance of surface S for the resonance wavelength value $\lambda_r$ is equal to this electrical resistance component, with no contribution from the inductive and capacitive components which compensate for each other. In other words, taking into account the electrical resistance contributions of bottom 12 and overcoat layer 13, and a quotient of the effective length over the effective thickness: $Z_S = R_s \cdot (2 \cdot w_b - w_s) / (h_b + 2 \cdot \delta_s)$ where $Z_S$ is the impedance of surface S for the resonance wavelength value $\lambda_r$ and for a direction of the electric field which is parallel to x, $R_s$ being the surface resistance of the conducting material of bottom 12 and of overcoat layer 13. Or in a known manner, $R_s = 1/(\sigma \cdot \delta_s)$, where σ designates electrical conductivity in an AC regime, equal to $\lambda_r / (\pi \cdot Z_0 \cdot \delta_s^2)$, $Z_0$ being the impedance in vacuum. We then have: $R_s = \pi \cdot Z_0 \cdot \delta_s / \lambda_r$, and consequently at resonance: $Z_S = \pi \cdot Z_0 \cdot \delta_s \cdot (2 \cdot w_b - w_s) / [(h_b + 2 \cdot \delta_s) \cdot \lambda_r]$. The critical coupling condition between surface S which is provided with resonators 10 and the external propagation medium for the radiation is, at resonance, $Z_s = Z_0$, which is $\pi \cdot \delta_s \cdot (2 \cdot w_b - w_s) = (h_b + 2 \cdot \delta_s) \cdot \lambda_r$, where $\lambda_r$ has the expression given above as a function of the geometric parameters of the resonators, the relative dielectric permittivities, and the depth of penetration.

Thus, critical coupling can be obtained by adjusting the thickness $h_b$ of layer 11 relative to the other parameters of the resonators. By definition of this critical coupling, the spectral reflectance of surface S for the radiation wavelength value $\lambda_r$ is zero. Based on these conditions for implementing the critical coupling, modifying the thickness $h_b$ of layer 11, in particular increasing $h_b$, makes it possible to break the impedance matching at resonance between surface S which is provided with resonators 10 and the external radiation propagation medium, so that the spectral reflectance becomes non-zero for radiation wavelength value $\lambda_r$. According to the invention, the value of the impedance of surface S is modified in this manner to such an extent that the spectral reflectance is greater than 40% for wavelength value $\lambda_r$.

Figure 3:
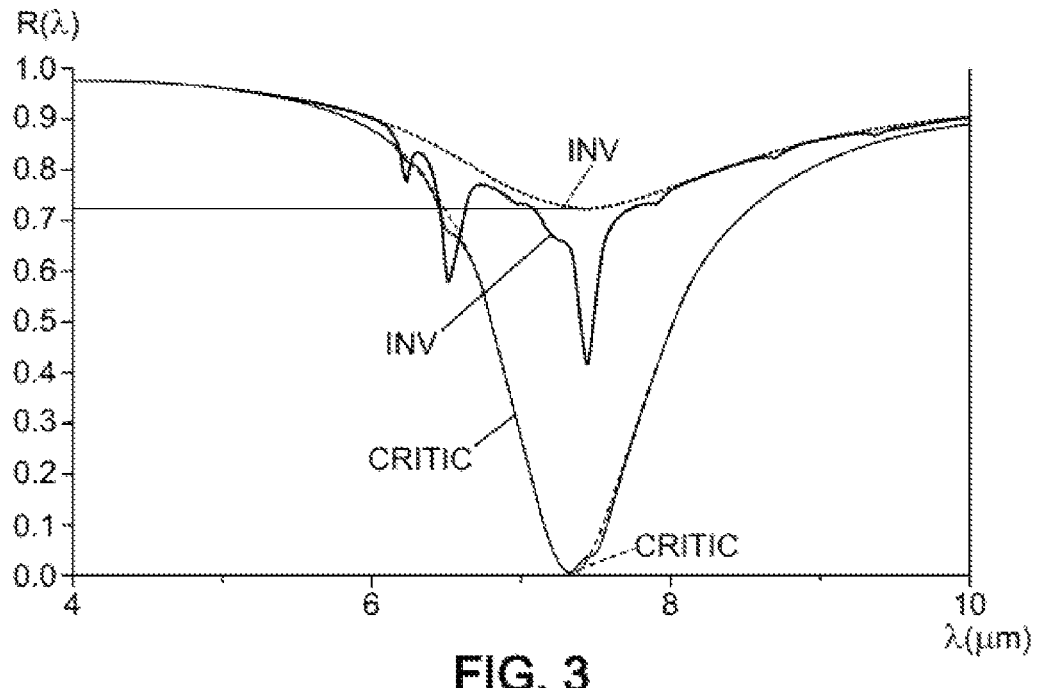
FIG. 3 is a spectral reflectance diagram which compares detection curves for a SEIRA spectroscopic detector as it existed before the invention and for a SEIRA spectroscopic detector according to the invention.

The following numerical values have been adopted for a SEIRA spectroscopic detector 100 in accordance with the invention: $w_b = 1.19$ μm, $h_b = 0.30$ μm, $w_s = 0.10$ μm, $h_s = 0.10$ μm. Critical coupling conditions correspond for example to $h_b$=0.05 µm and $w_b$=1.68 µm if the other values for $w_s$ and $h_s$ are the same. The dotted curves in the diagram of FIG. 3 correspond to these two sets of values: the curve labeled INV corresponds to the spectral reflectance for detector 100 according to the invention, and the one labeled CRITIC corresponds to the spectral reflectance for the detector which achieves the critical coupling conditions. The two detectors INV and CRITIC are according to the embodiment of FIG. 1a, i.e. having a radiation source which is external to support 1. In the diagram of FIG. 3, the abscissa axis identifies the radiation wavelength values, expressed in micrometers and denoted λ, and the ordinate axis identifies the spectral reflectance values, denoted R(λ). For the two detectors INV and CRITIC, the resonance wavelength $λ_r$ is equal to approximately 7.4 µm, and the spectral reflectance value of detector INV for this wavelength $λ_r$ is equal to approximately 72%, whereas that of detector CRITIC is zero or almost zero.

FIG. 3 also shows, as solid lines, spectral reflectance curves which are obtained for the two detectors INV and CRITIC when samples of 2,4-dinitrotoluene are deposited on their respective surfaces S, with a common sample thickness of approx. 50 nm (nanometers). The 2,4-dinitrotoluene molecules show absorption lines around 6.21 µm, 6.45 µm, 7.42 µm, 7.90 µm, 8.70 µm, and 9.35 µm. As can be seen in this figure, the presence of 2,4-dinitrotoluene, as revealed by these lines, is much more visible on the spectral reflectance curve of the detector according to the invention, compared to the detector which implements the critical coupling. For this, it is important that at least one of these absorption lines is within the resonance interval which extends from $λ_r·(1-1/Q)$ to $λ_r·(1+1/Q)$, where Q is the quality factor of resonators 10. For detector INV of FIG. 3, this quality factor Q is equal to 4.95, and for detector CRITIC, it is equal to 6.16. In practice, wide additional absorption structures, which are due in particular to the insulating material of layer 11, may be superimposed on the spectral reflectance curves R(λ) resulting from resonators 10 and from the absorption lines of the molecules contained in sample 101, but the principles and the attraction of the invention remain the same.

The inventors have determined that detectors in accordance with the invention were sensitive to small quantities of target molecules, for example between 48 ng (nanogram) and 93 ng for revealing the presence of 2,4-dinitrotoluene, or between 4.5 ng and 24 ng for amino-dinitrotoluene.

If the supports 1 provided with resonators 10 previously used for detectors INV and CRITIC are now used for SEIRA spectroscopic detectors in accordance with the embodiment of FIG. 1b, i.e. with supports which serve as sources of radiation via thermal emission effect, then the spectral reflectance values which are captured by optical detection means 3 are complementary in relation to 1.0 with the values of the diagram of FIG. 3, for each value of the wavelength λ of the detected radiation.

Figure 4:
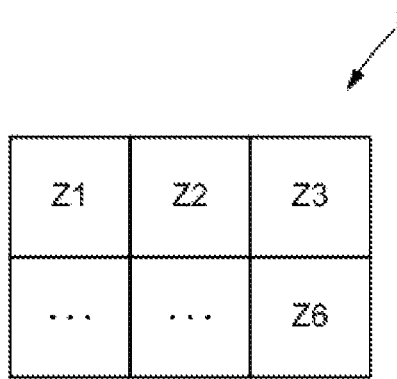
FIG. 4 illustrates an improvement of the invention.

One possible improvement of the invention can allow overcoming an insufficient width of the resonance interval $[λ_r·(1-1/Q), λ_r·(1+1/Q)]$ relative to an entire spectral analysis domain, between 2 µm and 10 µm. For example, for detector INV of FIG. 3, the lower limit $λ_r·(1-1/Q)$ is substantially equal to 5.9 µm, and the upper limit $λ_r·(1+1/Q)$ is substantially equal to 8.9 µm. This detector is therefore not suitable for detecting target molecules based on absorption lines which are below 5.9 µm or above 8.9 µm. The improvement of the invention then consists of implementing resonators 10 whose resonance wavelength values $λ_r$ are different, on surface S of support 1, and having all these resonators 10 be in contact in the same manner with sample 101 to be tested. FIG. 4 is a plan view of surface S of such a support 1. Surface S is divided into several zones, for example six zones $Z_1$, $Z_2$, $Z_3$ . . . , $Z_6$. Each zone contains resonators 10 which are all identical inside this zone, so that the zone functions as described previously, independently of the other zones. On the other hand, the resonators have values for at least some of their parameters $w_b$, $h_b$, $w_s$ and $h_s$ which vary from one zone to another, so that each zone is associated with a different resonance wavelength value. Thus, the resonance wavelength values can be distributed within the interval 2 µm-10 µm, or within part of this interval, so that the resonance interval $[λ_r·(1-1/Q), λ_r·(1+1/Q)]$ of each zone serves as an indicator of the absorption lines that are located inside it, and all the zones complement each other in this function.

Another way of varying the resonance interval $[λ_r·(1-1/Q), λ_r·(1+1/Q)]$ of resonators 10 of a SEIRA spectroscopic detector 100 in accordance with the invention may consist of using tunable resonators. For this, each resonator may be coupled to a reversibly adjustable component, such as a reverse-biased diode used as a variable-capacitance capacitor. Such diodes are commonly called varicaps, in the terminology of those skilled in the art. They may be electrically connected in parallel one-to-one to the capacitors which are formed by slots F of supports 1 shown in FIG. 2a and FIG. 2b, for example. A bias voltage of the varicaps can then be adjusted in order to modify the resonance wavelength value $λ_r$ of the resonators, and thus move the resonance interval $[λ_r·(1-1/Q), λ_r·(1+1/Q)]$ between 2 µm and 10 µm. This bias voltage value of the varicaps constitutes a control parameter which is applied to each resonator 10.

Finally, it is possible that sample 101 is able to simultaneously contain respective quantities of several different target molecules, and that the purpose of a SEIRA analysis of this sample is to reveal the presence of each target molecule in a differentiated manner, in a single analysis. The use of a detector 100 in accordance with FIG. 4 can then be particularly suitable, for example by separately dedicating one zone to an absorption line of each target molecule. However, it is possible that the absorption lines of two different target molecules are superimposed. This is the case, for example, of 2,4-dinitrotoluene and amino-dinitrotoluene, at 6.45 µm. To remove the ambiguity of a spectroscopic detection at only 6.45 µm, additional absorption lines of either of the target molecules, which do not show overlap, can also be used. These differentiated adsorption lines may be located within the resonance interval of the same zone as the superimposed absorption lines, or in one or more resonance interval(s) of zone(s) different from that of the superimposed lines. When more than two target molecules are to be revealed simultaneously, a differentiation strategy may be implemented which allows concluding with certainty regarding the presence or absence of each target molecule in the sample, despite overlaps between some of their absorption lines. The use of several zones, with respective resonators which have different resonance wavelength values from one zone to another as shown in FIG. 4, may then be necessary.

It is understood that the invention can be reproduced by modifying secondary aspects of the embodiments which have been described in detail above, while retaining at least some of the cited advantages. In particular, the resonators described may be replaced by others known to those skilled in the art, including resonators which each have limited sizes in the two x and y directions parallel to surface S of the support. In the case of resonators of limited sizes along x and y, their distribution may be in any manner in surface S of support 1. It is also possible to thus obtain a detector 100 which operates with the two directions of linear polarization of the radiation, respectively parallel to x and y. The optical detection components that have been described may also be replaced by others to result in an equivalent analysis function. Furthermore, support 1 may be adapted for gaseous, liquid, or solid samples to be tested. Finally, all numerical values that have been cited have been cited for illustrative purposes only, and may be changed according to the target molecules considered.

The invention claimed is:

1. A detector for surface-enhanced infrared absorption spectroscopy, adapted for revealing a presence of molecules, referred to as target molecules, when at least one absorption wavelength of said target molecules is comprised between 2 μm and 10 μm, and is also comprised within an effective spectral range of the detector, the detector comprising:

an opaque support, this support being opaque to radiation having a wavelength between 2 μm and 10 μm and having a surface which is provided with a plurality of electromagnetic resonators, the support being intended to receive, on or in said surface, a sample to be tested and likely of containing the target molecules, the resonators having a resonance wavelength $\lambda_r$ and a quality factor Q, and the effective spectral range of the detector being between $\lambda_r \cdot (1-1/Q)$ and $\lambda_r \cdot (1+1/Q)$;

stimulation means, adapted for sending an infrared radiation onto the surface of the support, or to cause an emission of infrared radiation by said surface of the support, said infrared radiation having a non-zero spectral intensity at at least one instant during an operation of the detector for each wavelength value which is within the effective spectral range of the detector; and optical detection means, adapted for detecting an alteration in part of the infrared radiation coming from the surface of the support, said alteration being produced by the target molecules contained in the sample located on or in said surface of the support, wherein the resonators are adapted and arranged in the surface of the support so that said surface of the support has an impedance, for an electromagnetic wave incident on said surface of the support and having the resonance wavelength w of the resonators, which is different from the impedance of vacuum, with a difference between the impedance of the surface of the support and the impedance of vacuum being adapted so that the minimum of a spectral reflectance factor of the surface of the support, as produced by the resonators at the resonance wavelength 2 in the absence of target molecules, is greater than 40%.

2. The detector according to claim 1, wherein the resonators are selected among Fabry-Pérot interferometers, plasmonic-antenna resonators, and Helmholtz-type electromagnetic resonators.

3. The detector according to claim 2, wherein each resonator is a Helmholtz-type electromagnetic resonator, and composed of a portion of a dielectric material which is in between a bottom and an overcoat layer of the resonator, both electrically conducting and parallel to the surface of the support, the overcoat layer for each resonator furthermore being divided by a slot into two overcoat portions which are electrically insulated from one another.

4. The detector according to claim 3, wherein:

the bottoms and the portions of the dielectric material extend continuously between two of the resonators which are adjacent in the surface of the support, and the contiguous portions of the overcoat layer of said adjacent resonators extend continuously between two of the resonators which are adjacent in the surface of the support.

5. The detector according to claim 1, further comprising a plate which is semi-transparent to an electromagnetic wave that is incident on the surface of the support and has any wavelength value within the effective spectral range of the detector, said plate being arranged above said surface of the support and parallel to said surface of the support so that the sample to be tested is located between said surface of the support and said plate.

6. The detector according to claim 1, wherein each resonator comprises some parts of an electrically conducting material and other parts of an electrically insulating material, the electrically conducting material being based on a metal, in particular selected among gold, silver, nickel, titanium, chromium, and aluminum, or based on graphene or titanium nitride, or based on a doped semiconductor material, in particular selected among tin-doped indium oxide, zinc oxide, and fluorine-doped tin oxide, and the electrically insulating material being based on silica, alumina, titanium oxide, silicon nitride, hafnium oxide, zinc sulfide, zinc selenide, or based on an undoped semi-conductor, or based on a polymer, in particular selected among polymethylmethacrylate, polyethylene, and a polyimide.

7. The detector according to claim 1, wherein the support is suitable for receiving the sample to be tested inside a fluidic circuit which is located in or on said surface of the support, in addition to the plurality of resonators.

8. The detector according to claim 1, intended to reveal the presence of molecules specified for said detector and which act as target molecules during use of said detector, wherein the support is adapted for receiving the sample to be tested on the surface of said support, and the detector further comprises at least one chemical functionalization compound which is grafted onto said surface of the support, said chemical functionalization compound being selected so as to selectively bind the specified molecules.

9. The detector according to claim 1, wherein the stimulation means comprise a source of the infrared radiation which is external to the support and is arranged to send said infrared radiation onto the surface of the support, and the optical detection means are arranged to receive part of said infrared radiation which has been produced by the source and then reflected by the surface of the support;

or the stimulation means comprise means for heating the support, and the optical detection means are arranged to receive at least part of the infrared radiation which is thermally emitted by the surface of the support.

10. The detector according to claim 1, wherein the optical detection means comprises a spectrometer or a hyperspectral sensor.

11. The detector according to claim 1, intended to reveal a presence of molecules specified for said detector and acting as target molecules during use of said detector, wherein the optical detection means comprises a spectral filter having a filter window which contains the absorption wavelength of the specified molecules, and also comprises a sensor arranged to receive at least part of the radiation infrared which comes from the surface of the support through the spectral filter, or the optical detection means comprises an array of spectral filters in which at least one of said spectral filters has a filter window which contains the absorption wavelength of the specified molecules, and also comprises an image sensor arranged to capture an image of the array of spectral filters, said image being formed by the infrared radiation which comes from the surface of the support and passes through said array of spectral filters.

12. The detector according to claim 1, wherein the minimum of the spectral reflectance factor of the surface of the support, as produced by the resonators at the resonance wavelength A in the absence of target molecules, is greater than 60%.

13. The detector according to claim 1, wherein the resonators are adapted to exhibit resonance wavelength values which vary between several of said resonators, the interval from $\lambda_r \cdot (1-1/Q)$ to $\lambda_r \cdot (1+1/Q)$ for one of the resonance wavelength values containing at least one absorption wavelength value of specified molecules, and the interval from $\lambda_r \cdot (1-1/Q)$ to $\lambda_r \cdot (1+1/Q)$ for at least one other of the resonance wavelength values containing at least one other absorption wavelength value which differentiates the specified molecules from other molecules also likely to be contained in the sample to be tested.

14. The detector according to claim 1, wherein at least some of the resonators are tunable, so that a value of the resonance wavelength of said tunable resonators varies as a function of a control parameter applied to each of said tunable resonators.

15. A method for revealing a presence of molecules in a sample to be tested, referred to as target molecules and identified by at least one absorption wavelength of said target molecules which is between 2 μm and 10 μm, said method comprising the following steps:

/1/providing a detector which is in accordance with claim 1, and for which the effective spectral range contains the absorption wavelength of the target molecules;

/2/bringing at least part of the sample onto or into the surface of the support of the detector which is provided with the electromagnetic resonators; and /3/simultaneously activating the stimulation means and the optical detection means of the detector, in order to detect an alteration in part of the infrared radiation which comes from the surface of the support, said alteration being produced by the target molecules for the absorption wavelength of said target molecules.

16. The method according to claim 15, wherein the target molecules whose presence is to be revealed in the tested sample are part of the specified molecules.

* * * * *